May 25, 1937.  J. E. PADGETT  2,081,505
UNIVERSAL JOINT
Filed April 2, 1932    2 Sheets-Sheet 2
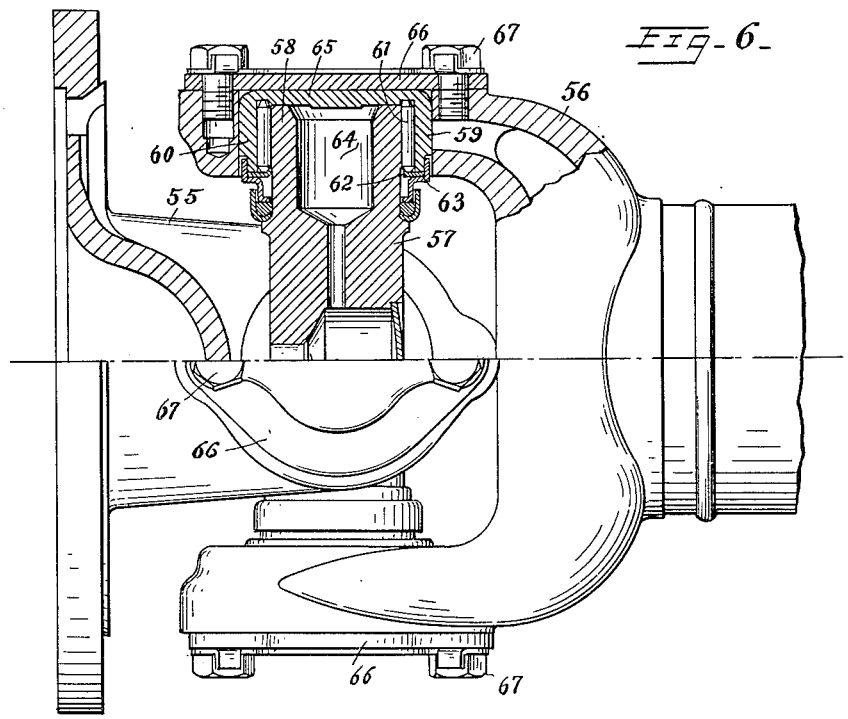
Fig-6-
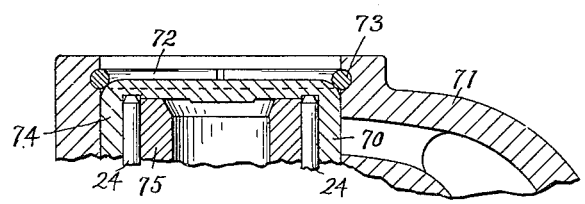
Fig-7-
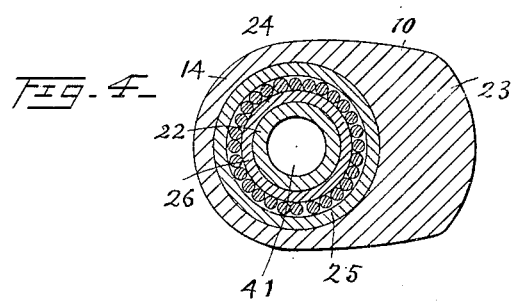
Fig-4-
Inventor:
JOSEPH E. PADGETT.
Kwin Hudson & Kent
attys.

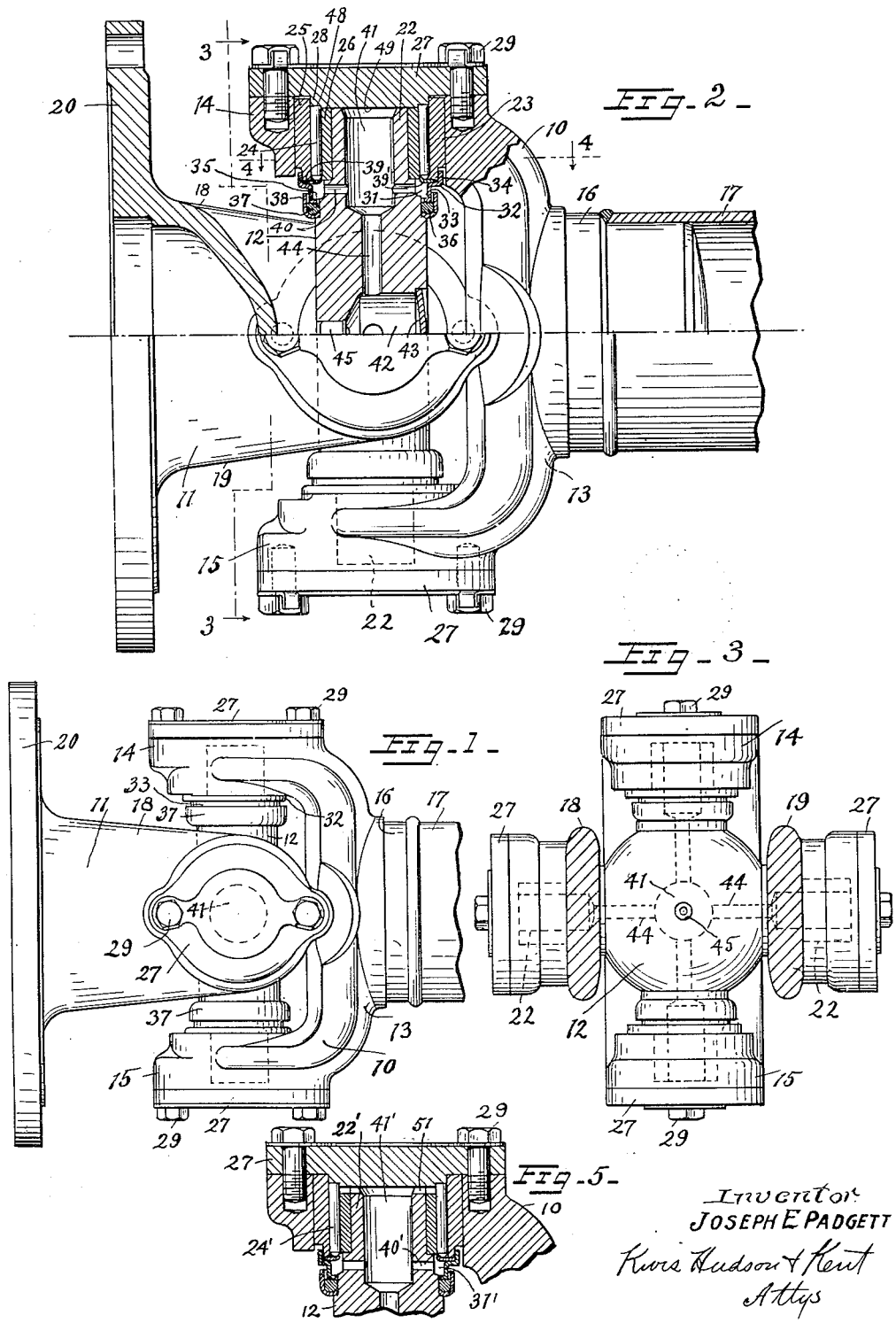

Patented May 25, 1937

2,081,505

UNITED STATES PATENT OFFICE 2,081,505

UNIVERSAL JOINT

Joseph E. Padgett, Toledo, Ohio

Application April 2, 1932, Serial No. 602,730

1 Claim. (Cl. 64—17)

This invention relates to torque transmitting universal joints and more particularly to a novel and improved construction for devices of this kind.

An object of the present invention is to provide an extremely efficient form of universal joint having novel bearing means incorporated therein and embodying novel means for supplying lubricant to the bearing surfaces.

Another object of this invention is to provide an improved universal joint having bearings incorporating needle elements of relatively small diameter and embodying novel means for feeding lubricant to the needle elements.

The invention may be further briefly summarized as consisting in certain novel combinations and arrangement of parts, hereinafter described, and particularly set out in the appended claim.

In the accompanying sheets of drawings Fig. 1 is an elevational view of a universal joint constructed according to my invention;

Fig. 2 is another elevational view thereof, but showing the device partly in section;

Fig. 3 is a transverse sectional view taken substantially as indicated by the line 3—3 of Fig. 2;

Fig. 4 is another transverse sectional view taken on line 4—4 of Fig. 2;

Fig. 5 is a partial sectional view of another universal joint embodying my invention;

Fig. 6 is an elevational view, partly in section, of another universal joint constructed in accordance with my invention; and Fig. 7 is a partial sectional view of still another universal joint constructed in accordance with my invention.

Detailed reference will now be made to the accompanying drawings illustrating a universal joint of the yoke type which embodies the novel bearing and lubricating means of my invention, but before proceeding with this detailed description, it should be understood that my invention may be incorporated in various other structural arrangements and may be applied to various other types of universal joints.

In the drawings illustrating the principles of my invention, I have shown a universal joint comprising a pair of yoke members 10 and 11, and a connecting member 12 disposed between these yoke members for operatively connecting the same together. The yoke member 10 comprises a body 13 having a pair of spaced arm portions 14 and 15, and also having a tubular extension 16, which may be connected to a shaft, such as a propeller shaft 17 of a motor vehicle. The yoke member 11 is constructed with a pair of arm portions 18 and 19 similar to the arm portions of the yoke member 10, and with a flange 20 for connection with any desired power transmitting shaft or element.

The connecting member 12 may be of any appropriate form of construction and, in this instance, is shown as being a cross type of connecting member, which is disposed between the yoke members 10 and 11, and which is provided with aligned pairs of trunnions or journal portions 22 arranged to extend into aligned openings 23 formed in the arm portions of the yoke members. As thus far described, my universal joint does not differ materially from universal joints of this type which have been constructed heretofore, but instead of the plain bearings heretofore provided between the trunnions of the connecting member and the arm portions of the yoke members, I employ floating-bushing bearing means comprising needles 24 which are so arranged that the efficiency of the device is enormously increased and its useful life materially prolonged.

Although the needles 24 may be arranged between the outer surface of the journal portion and the inner surface of the opening provided in the yoke arm, I prefer to provide bearing races 25 and 26 for the needles, which races are associated respectively with the yoke arm opening and the journal portion extending thereinto. In this instance, I show the race 25 as comprising a substantially cylindrical sleeve, preferably formed of hardened metal, which extends into the yoke arm opening 23. This cylindrical bearing race may be retained in the yoke arm opening in any suitable manner, but I prefer to attain this end by mounting the same upon the cap or plate 27 which closes the yoke arm opening outwardly of the journal portion extending thereinto, the cap 27 and the race 25 forming a socket. The bearing race 25 may be connected to the cap 27 by providing the latter with a shoulder portion 28 upon which the bearing race may be shrunk or otherwise retained. The cap may be retained in assembled position, with the bearing race 25 extending into the yoke arm opening as shown in Fig. 2, by suitable connecting bolts or screws 29.

The bearing race 26 is also substantially cylindrical in form, but of somewhat smaller diameter than the bearing race 25, so that when assembled on the trunnion 22 in coaxial relation with the bearing race 25, an annular space will be provided between the adjacent surfaces of the races.

According to my invention, I arrange the needles 24 in a full or continuous annular series in the space provided between the bearing races, with their axes extending substantially parallel with the axis of the trunnion, as shown in Fig. 2 of the drawings. These needles are provided in sufficient number that, when assembled in the space between the bearing races 25 and 26, they will substantially fill this space and may contact with each other along opposite sides of each roller thereby forming a cylindrical sleeve or bushing, the needles, however, being so dimensioned relative to the space that a small clearance space is provided between adjacent needles, and between the needles and the races. These clearance spaces allow the needle assembly to move as a sleeve or bushing without each needle being constrained to rotate on its own axis at full rolling speed. The action of the needles depends upon variable factors, the more important of which are the load being transmitted through the universal joint, the speed of rotation of the joint, and lubricant and friction, with the result that some needles may slide with no rotation about their own axes, some needles may have a combined rolling and sliding action, and some needles may roll without any sliding action. It should be noted in this connection, that the needles are not mounted in and separated by a retaining frame, such as that commonly known in the bearing art as a cage, but are allowed to contact with each other, and are retained in place only by their contact with the adjacent parts of the device.

The needles 24 are of relatively small diameter, being of the diameter of those bearing elements which are known in the art as "needle" bearings. In this instance the needles 24 are of approximately ⅛ of an inch in diameter and, although this diameter for the needles may be varied, I find that in the particular universal joint structure illustrated, rollers of this diameter give very satisfactory service.

For supplying lubricant to the needles, and to the surfaces of the races 25 and 26 which engage the needles, I provide the annular lubricant chamber or channel 31 which is located substantially at the inner end of the series of needles. This lubricant chamber extends around the trunnion and is formed by a sheet metal sleeve or shell 32, which is disposed with the cylindrical portion 33 thereof in spaced relation to the trunnion, as shown in Fig. 2. This sleeve may be of any desired form, but is preferably constructed with an enlarged tubular portion 34 which telescopes around the inner end of the bearing race 25, and with an inturned flange 35 at its inner end for engagement with the annular sealing gasket 36. When the cap 27 is secured to the yoke arm by means of the screws 29, the sleeve 32 will be moved inwardly causing the flange 35 thereof to be pressed against the sealing gasket. This gasket may be of any suitable material and is preferably disposed in a sheet metal shell 37. This shell is constructed in the form of a ring, as shown in Fig. 2, with the outer cylindrical end 38 thereof telescoping around the cylindrical portion 33 of the sleeve 32. With the construction just described, it will be seen that the annular lubricant chamber 31 is fully enclosed and sealed against the escape of lubricant, and that the ring member 37 protects the gasket in such a manner that for water or other foreign matter to come in contact with the gasket, such foreign matter must pass between the ring member and the sleeve in opposition to the action of centrifugal force.

To prevent the needles 24 from dropping down into the lubricant chamber 31, I employ a ring-shaped member 39, which may be held in place by being clamped between the sleeve 32 and the inner end of the bearing race 25, and which is formed with a laterally extending flange or shelf portion 39' having supporting engagement with the lower ends of the needles. Although the ends of the needles may be squared off, or may be of any other desired shape, I prefer to construct these needles with their lower ends of substantially conical shape, as shown in Fig. 2, and to construct the laterally extending shelf portion 39' with an annular recess therein, into which these conical ends extend when the needles are in assembled position.

Lubricant may be supplied to the chamber 31 through one or more passages 40 leading from a reservoir, such as the reservoir 41 which is shown in Fig. 2 as being located in the trunnion 22. In addition to the lubricant reservoir located in each of the four trunnions of the connecting member 12, I provide the body of the latter with a recess 42 forming an additional or main lubricant reservoir. This recess may be closed by suitable means such as the deformable plug 43, and communicates with each of the reservoirs 41 through the radially extending passages 44. At assembly of the universal joint, the main lubricant reservoir, and the lubricant reservoirs provided in the trunnions, are charged with a quantity of lubricant, after which the main reservoir may be permanently sealed. If desired, however, the main reservoir may be closed by a lubricant fitting 45 of the check valve type, so that additional lubricant may be introduced into this reservoir from time to time as may become necessary or desirable.

From the arrangement described, it will be seen that during rotation of the universal joint the body of lubricant contained in the main reservoir will tend to travel outwardly into the reservoirs 41 under the action of centrifugal force, causing lubricant to be supplied to the lubricant chambers 31 from which it is supplied to or picked up by the rollers 24. Although I am not definitely certain of the manner in which the needles 24 perform their function, I believe, however, that during operation of the universal joint under normal loading, the surfaces of the races 25 and 26 slide relatively to the needles without the latter rotating about their own axes. Should the load become excessive, or should any portion of the bearing races 25 and 26 become dry, the increased friction between the needles and races will cause the needles to rotate about their axes, thereby delivering additional lubricant to the surfaces of the bearing races. Because of this action of the needles, I find that a universal joint of the construction herein disclosed is extremely efficient and durable in operation.

To facilitate the assembling of my universal joint, and to facilitate handling and stocking the bearing formed by the needles 24, it is desirable that these needles be retained at all times within the race 25 which, as stated above, is secured to the cap 27. Accordingly, I provide the cap with a shallow annular recess 48 in which the outer ends of the needles are retained by the ring-shaped member 39. The latter member is clamped against the inner end of the bearing race 25 by the metal sleeve 32 which is secured to this bearing race, preferably by providing a press fit between the telescoping tubular portion 34 of the sleeve and the inner end of the bearing race.

It will be seen from the arrangement described that the cap 27, race 25, needles 24, ring-member 39 and sleeve 32 constitute a bearing assembly which can be conveniently handled as a self-contained unit.

It will be noted that when this bearing unit is assembled into the opening 23 of the yoke arm, the inner face 49 of the cap 27 forms a bearing surface which absorbs the thrust of the trunnion 22 and which positions the connecting member with respect to the axes of rotation of the yokes.

Since under the action of centrifugal force the lubricant will tend to travel toward the outer end of the reservoir 41, it may be desirable to provide for the feeding of lubricant to the rollers at the outer end of this reservoir. Accordingly, as shown in Fig. 5 of the drawings, one or more grooves or passages 51 may be formed in the outer end of the trunnion 22' for feeding lubricant from the reservoir 41' to the rollers 24'. In the operation of this modified form of universal joint, some of the lubricant contained in the reservoir 41' will be supplied to the annular lubricant chamber 31' and fed by the latter to the inner ends of the needles, while some of the lubricant which is thrown toward the outer end of this reservoir by centrifugal force, will be fed through the passages 51 to the outer ends of the needles. It will be understood, of course, that when the lubricant passages 51 are provided at the outer ends of the trunnions, the connecting passages 40', which supply lubricant to the annular chambers 31', may be omitted if desired.

In Fig. 6 of the drawings, I have illustrated another universal joint construction embodying my invention, which is generally similar to the universal joint illustrated in Fig. 2. In this construction, the yoke members 55 and 56 are operatively connected by a ring-type connecting member 57 having journal portions 58 extending into the openings of the yoke arms. These journal portions cooperate with needle bearing assemblies 59 which are mounted in openings provided in the yoke arms. Each bearing assembly comprises a bearing cup 60, and a full annular series of relatively small needles 61 which are retained in the bearing cup by the annular retaining ring 62, the latter being clamped to the bearing cup by the ring member 63. In this construction, the needles contact directly with the outer surface of the journal portion 58 and the inner surface of the bearing cup 60, without requiring separately formed races as are shown in Fig. 2.

For lubricating the needles of the bearing assembly, I provide a reservoir 64 in the journal portion 58. The bottom wall 65 of the cup 60 forms a thrust bearing which is engaged by the outer end of the journal portion, and which forms one wall of the lubricant reservoir. During operation of my universal joint, lubricant is delivered outwardly to the needles through the clearance which exists from time to time between the outer end of the journal portion and the bottom wall 65.

The needle bearing assembly 59 may be retained in the opening of the yoke arm by means of a plate 66, which is removably secured to the yoke arm by the screws 67, and which engages the bottom wall 65 of the bearing cup. However, if desired, the needle bearing assembly may be retained in the opening of the yoke arm by any other suitable means, such as that illustrated in Fig. 7, wherein a needle bearing assembly 70 is retained in the opening of the yoke arm 71 by providing an expansible spring ring 72, which is snapped into an annular recess 73 provided in the wall of the yoke arm opening. The recess is so located that the spring ring engages the outer end of the bearing cup 74 to retain the bearing assembly in the yoke arm opening in proper relation around the journal portions 75.

It will now be readily seen that I have provided a novel and efficient form of universal joint employing contact elements of the "needle" type, and embodying novel means for supplying lubricant to the needles of the bearings. It will also be readily seen that a universal joint embodying this construction will be very efficient in operation and will be capable of rendering prolonged service with minimum wear, and without requiring attention or replacement of parts.

Having thus described my invention what I claim is:

In a universal joint having trunnions, bearings for said trunnions, each bearing comprising a cap member of hollow cylindrical form provided with one end wall and adapted to be entered with a close fit through an opening provided in one of the members of the joint, the side walls of said cap member serving to furnish radial bearing support and the end wall serving to furnish end thrust bearing support for the trunnion received in the cap member, the cap member being suitably secured to the joint member, rollers disposed inside the cap member between the side walls thereof and the trunnion for anti-friction radial bearing support of the trunnion, means on the lower end of the cap member to retain the rollers, and a ring mounted on the outside of the cap member at its lower end on a reduced portion thereof and serving to enclose and support the last mentioned means, said ring being small enough in outside diameter to be entered freely with the cap member through the opening in the joint member.

JOSEPH E. PADGETT.